US005634855A

United States Patent [19]
King

[11] Patent Number: 5,634,855
[45] Date of Patent: Jun. 3, 1997

[54] PORTABLE GOLF CLUB SWING SPEED INDICATOR WITH DOWNWARD ANGLED COLLIMATED LIGHT SENSORS

[76] Inventor: James A. King, 1824 Sanchez Way, Escalon, Calif. 95320

[21] Appl. No.: 476,341

[22] Filed: Jun. 7, 1995

[51] Int. Cl.⁶ .................................................. A63B 69/36
[52] U.S. Cl. ........................................ 473/221; 473/219
[58] Field of Search ................................ 473/219–225, 473/150, 409, 151; 364/410; 273/25, 26 R; 356/28, 28.5; 324/175, 160

[56] References Cited

U.S. PATENT DOCUMENTS

| | | | |
|---|---|---|---|
| 2,571,974 | 10/1951 | Walker | 473/225 |
| 3,601,408 | 8/1971 | Wright | 473/225 |
| 3,685,909 | 8/1972 | Schwartz | 356/28 |
| 4,163,941 | 8/1979 | Linn, Jr. | 473/222 |
| 4,180,726 | 12/1979 | DeCrescent | 273/26 R |
| 4,254,956 | 3/1981 | Rusnak | 473/225 |
| 4,304,406 | 12/1981 | Cromarty | 473/225 |
| 4,515,365 | 5/1985 | Horikoshi et al. | 273/25 |
| 4,583,733 | 4/1986 | Ito et al. | 273/26 R |
| 4,872,687 | 10/1989 | Dooley | 473/184 |
| 5,056,783 | 10/1991 | Matcovich et al. | 273/26 R |
| 5,342,054 | 8/1994 | Chang et al. | 364/410 |
| 5,452,906 | 9/1995 | Takase et al. | 473/222 |

Primary Examiner—Mark S. Graham
Assistant Examiner—Mark A. Sager

[57] ABSTRACT

A meter which detects, determines and displays the highest speed obtained in a golf club swing, being coin-operated, highly portable and battery powered. The meter includes a stabilizing base platform supporting a vertical post holding an electronic control box having a LCD, indicator lights and coin receiver. The base sits on a ground surface unattached, and supports a rubber golf tee secured relative to a pair of light sensors and light emitters. The sensors are mounted on the pedestal, and register an interruption in light directed into the sensors from the lights. The lights are mounted on the base and secured in the proper alignment with the sensors so that the entire unit can be easily moved such as for mowing around without misalignment occurring. The light sensors and the lights are on oppositely disposed sides of the tee so that a swinging golf club will interrupt the lights and cause the sensors to signal counters to begin or stop counting. Two sensors are used in spaced relationship to one another, one sensor straight across from each of the two fixed lights. The sensors are contained within collimator tubes which are aimed downward at an angle toward the lower positioned lights, thus assisting in eliminating false readings and the user from having to make electronic adjustments to compensate for ambient light conditions.

2 Claims, 9 Drawing Sheets

PORTABLE GOLF CLUB SWING SPEED INDICATOR WITH DOWNWARD ANGLED COLLIMATED LIGHT SENSORS

BACKGROUND OF THE INVENTION

1. Field of the Invention

This invention relates to golf training and practice aids in general, and more precisely to devices which determine the speed of a golfer's clubhead just prior to the clubhead impacting an object golf ball.

2. Description of the Related Prior Art

There exists prior art golf training and practice devices in which a golf club is moved past a sensing station which detects and relates information, either in printed or visual display mode, concerning certain characteristics of the golfer's swing, such as club speed for example. All of the prior art golf club swing speed meters of which I am aware include significant shortcomings which the present invention has overcome.

The following are shortcomings which typically exist in related prior art devices. (1) False triggering and readings due to changes in ambient light conditions such as from shadows from trees, plants, people, clouds and the like, and flashes from shinny objects such as from vehicles on nearby roads and from shinny golf clubs. (2) The requirement that the user (golfer) make inconvenient and sometimes complicated adjustments to the swing meter electronics via adjustment knobs and dials prior to or even during practice, otherwise the user will receive false signals and readings. (3) The requirement that the golfer use a specially equipped or non-standard club, or a club fitted with special equipment operable with the swing meter, otherwise the swing meter is inoperable. (4) The requirement that each time the swing meter is moved, such as to be stored or for mowing around, that either lights or light reflectors be carefully and properly positioned again prior to use in order to interact with light receivers or sensors of the swing meter. (5) Some golf swing meters are not easily moved, and make it difficult to mow around and maintain the turf, as they are designed for outdoor use on the turf, being secured to the ground in a difficult to move manner. (6) Since some prior art swing speed meters are not easily moved, being secured to the ground, they are exposed to vandalism during the night or when otherwise unguarded.

Certainly not all prior art golf swing meters have all of the above listed shortcomings, but all appear to have one or more of these significant problems.

An example of a golf swing meter which does not appear easily moved due to certain components thereof being anchored into the ground is shown in U.S. Pat. No. 3,918,073 issued Nov. 4, 1975 to J. F. Henderson ET AL. Fixed or stationary swing meters or portions thereof create problems pertaining to mowing and maintaining the of turf, and leaves the device exposed at night to vandals.

An example of a golf swing meter which uses a specially equipped club is shown in U.S. Pat. No. 5,114,150 issued May 19, 1992 to Y. Matsumura. The requirement of the golfer using a club affixed with reflective or otherwise additional non-standard equipment on the club makes the golfer have to either buy and use a special club or the equipment to affix to his club, and if he prefers to practice with a variety of clubs, then this can become expensive and inconvenient.

An example of the requirement that the user (golfer) make adjustments to the swing meter electronics via adjustment knobs prior to or during practice is shown in U.S. Pat. No. 4,477,079 issued Oct. 16, 1984 to A. A. White, wherein an ambient light selector switch is utilized. The White device also exhibits the requirement that light reflectors be carefully aligned by the user to interact with separately placed light receivers. The White device, as well as most if not all prior art swing speed meters which utilize reflective or transmitted light through which the golf club passes are believed to be subject to false triggering and readings due to changing ambient light conditions such as fast moving clouds passing over, or flashes of light from shinny golf clubs, passing automobiles and other reflective objects under the right conditions.

The present invention addresses and solves the above shortcomings to provide an improved golf club swing speed meter.

SUMMARY OF THE INVENTION

The present invention may take numerous structural embodiments within its true scope other than that specifically herein detailed to exemplify the invention. The present invention (swing speed meter) is an electronic meter apparatus which detects, measures and outputs data regarding the highest speed obtained in a golf club swing within a ball striking zone. The swing meter is preferably coin-operated, and is intended to be placed at golf courses or elsewhere whereat players will deposit coins in order to be given a limited amount of play, such as determined by time or number of swings, with which the meter will measure and display the speed of their golf club swings.

The present swing meter is preferably highly portable, being light in weight and preferably under about 75 pounds so it can be moved by a single person as a unit for turf maintenance and the like. The swing meter utilizes light emitters which are preferably LEDs, and aligned light receivers or sensors to detect the transition of a golf clubhead and measure the speed of the club, and the lights are affixed in the manufacturing of the swing meter prior to shipping in proper alignment with the light receivers (sensors), and once properly aligned, need not be realigned after relocating the swing meter. The swing meter assembly is preferably readily in-part dismantlable for shipping, easy storage and to help prevent vandalism to certain parts, i.e., a meter box housing and electronics, and the light emitters and light receivers are arranged to be automatically realigned back to factory alignment upon reassembly of the swing meter.

The present swing meter is preferably battery powered, requiring no costly and potentially dangerous high voltage external wiring extended to the unit, thereby being self-contained and able to be placed and used just about anywhere desired. A built-in low battery power detecting circuit and battery charging circuit is preferably included with the electronics in the meter box. The present swing meter is structured so as to not require any adjusting by the user for ambient light conditions or changing ambient light conditions, and is not subject to false triggering and readings due to shadows, clouds, sunshine and momentary flashes of light, swaying tree limbs, clouds and the like. For the purposes of this disclosure, the term "ambient" light is that which has a source other than the light emitters of the swing meter intended to be directed into the light sensors of the present swing meter.

The present swing meter allows use of any golf club desired, without any special or additional equipment attached to the club.

The clubhead swing speed is preferably displayed on a LCD (liquid crystal display) on the meter box, and in the U.S.A., the display is in miles per hour, and in other countries it could be in metrics. The present golf club swing speed indicator includes a stabilizing base (platform) which functions to support a vertically rising pedestal or post holding the meter box having electronics therein, and indicator lights, activation switches, a coin receiver and the LCD. The post supports the meter box at a convenient height for depositing coins and pressing start and selection buttons. The base sits on a ground surface, but is preferably not attached to the ground. The base also supports a rubber golf tee properly placed and secured relative to a pair of the light sensors. The light sensors which detect the transition of golf clubhead in the area of the rubber tee, are mounted stationary on the post, and register an interruption in light directed into the sensors by a moving golf club. The lights directed into the sensors are preferably low power consuming ultrabright LEDs mounted on the base in spaced fixed relationship to the light sensors on the post, and secured in the proper alignment with the light sensors, and shinning into the light sensors. The LEDs preferably output light in a frequency range at which the light sensors are most sensitive, and with continued reading this aspect will become understood to be one which helps eliminate false readings and triggering. The rubber tee is positioned between the LEDs and the light sensors. Moving the relatively lightweight portable meter, such as for mowing the turf, will not affect the alignment of the lights with the sensors because it can be moved as an assembled and operable "unit", or it can be in-part disassemble, and then moved or shipped. Error resistant indexed connections (screws, nuts and bolts in holes) are provided which automatically align the LEDs with the sensors when the unit is assembled. The light sensors are contained within light collimators or tubes having small diameter openings, and the collimator tubes are aimed downward at an angle or slope, and the LEDs are positioned lower than the collimators. The combination of the downward angle and collimator tubes with small light inlet openings help further eliminate false readings and the user from having to make any adjustments to electronics via knobs and the like to compensate for ambient light conditions or changing ambient light. As will be explained later, self adjusting sensor amplifiers which are referenced to existing light conditions are also preferably utilized, and a memory circuit is also preferably utilized to further help eliminate false signals and readings, and the need for the user to adjust or calibrate the electronics.

The top surface of the base in the area of the rubber tee is covered with artificial grass to help prevent damage to golf clubs.

In order to use the swing meter, the golfer needs only to drop a coin or coins into the coin acceptor, press a start or selection switch, place a golf ball on the rubber tee held on the base, stand in the proper location adjacent the base, and then swing and drive the ball. The LCD on the meter box will display in numbers the speed of movement of the clubhead just prior to it striking the ball. A printed record or audio message could be made and output in conjunction with the LCD or absent the use of the LCD. The golfer then places another ball on the tee, and swings again. The LCD will automatically again display the speed of that swing of the golf club, whether slower or faster than the previous swing. The electronics of the swing meter in effect automatically reset after each swing via the next swing or a back stroke when addressing the ball, eliminating the need for the golfer to intentionally reset the electronics of the swing meter after each swing.

In the preferred structure of the invention, the base is substantially wide, and the pedestal or post is in the center of the base, and the base supports a rubber tee on two opposites sides of the pedestal so both a left and a right handed golfer can practice, either one at a time or simultaneously. The light sensors and light emitters, as well as the electronics are essentially duplicated for this dual player embodiment.

BEST MODES FOR CARRYING OUT THE INVENTION

Figure 1:
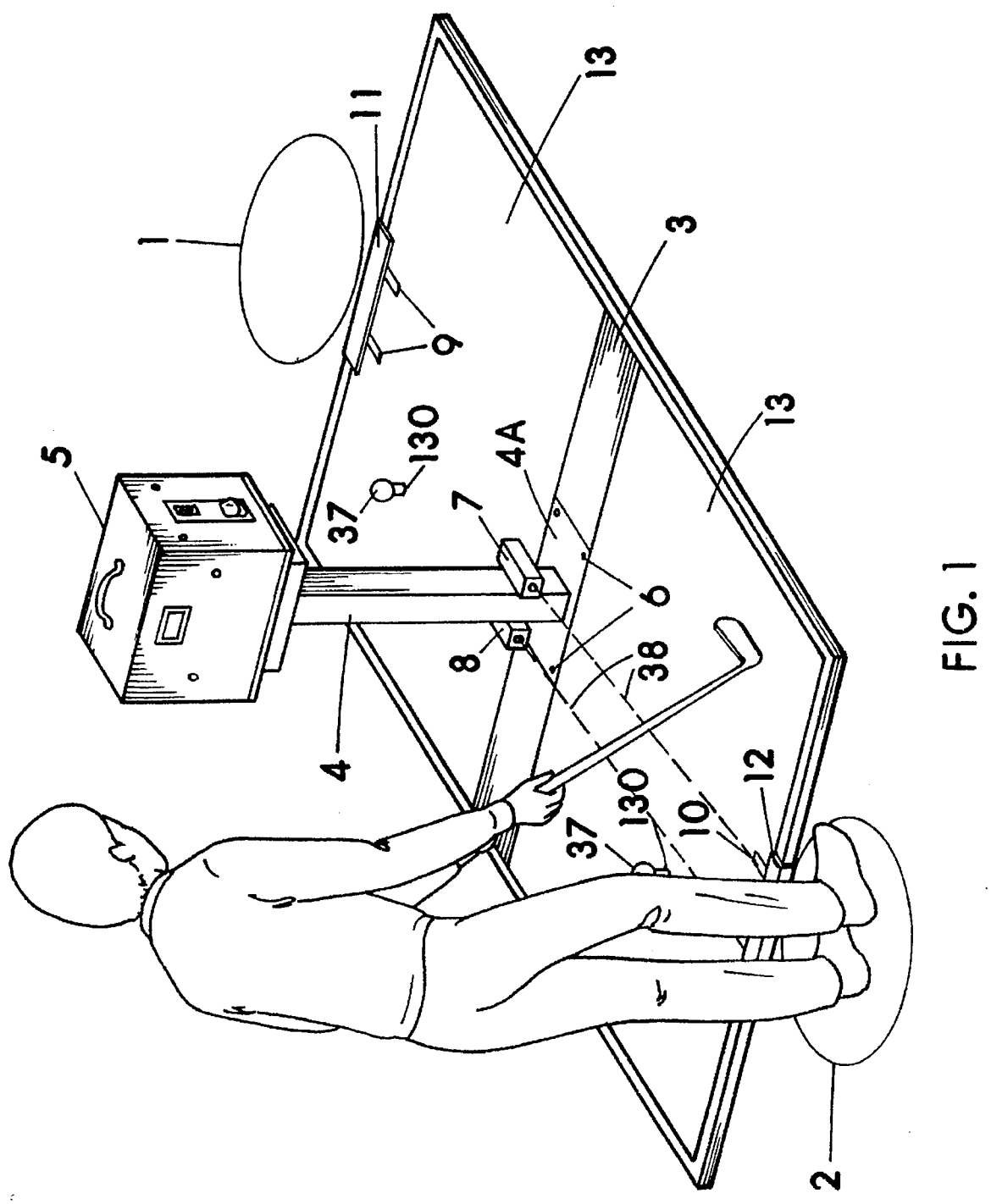
FIG. 1 is a right front perspective view of the dual (left and right handed) golf practice swing speed measuring apparatus in accordance with the present invention.

A golf practice and swing speed measuring apparatus which exemplifies a preferred embodiment dual player version of the present invention is herein described while referring to the drawings. FIG. 1 shows circles indicating for illustrative purposes both the left hand zone 1 and the right hand zone 2 where the golfers stand. Another simplified embodiment of the present invention includes only a right handed position, and yet another simplified embodiment of the present invention includes only a left handed position. Light sensor units 7 and 8 are mechanically accurately affixed and maintained in alignment via attachment to post 4, the light sensor units 7 and 8 are aligned with high illuminance low power consuming LED light stations 9 and 10, which are retained and protected by mounting bracket assemblies 11 and 12 serving to both support the LEDs and to protect them from damage. Clubhead swing speed is derived from the sensed interruption of light beams 38 and with electronic processing of the time between two light beam 38 interruptions as will be detailed. Artificial grass practice mats 13 and rubbery tees 130 both secured to base 3 allow the golfer to place a golf ball 37 on the provided affixed tees 130 or on the simulated grass 13 and practice hitting balls with any type of golf club. Base 3 is rectangular, wide and relatively thin, and is preferably made of welded metal tubing and attached plywood for example, with the artificial grass 13 being affixed atop of the plywood and the plywood fastened to the framework of metal tubing. Other suitable materials may be used to construct base 3. FIG. 1 also shows the wide support base 3; vertical post 4 having a small horizontal metal plate 4A affixed by welding or the like to it at the bottom end thereof, with horizontal plate 4A attached to the center of base 3 with security bolts 6 (vandal resistant) which require a special or not readily available wrenching tool to remove the bolts 6. Also shown is meter box 5 attached and supported on the upper end of post 4, with post 4 being removable of base 3 via the removal of bolts 6, and meter box 5 being removably from post 4 as will be appreciated with continued reading. Disconnectable electrical connecters 19, 20, and conductors 15 between meter box 5 and light sensor units 7, 8 on post 4, and conductors 15A between light sensor unit 7, 8 and LED light stations 9 and 10 on base 3 (see FIG. 5) which extend via exiting through the bottom of post 4 and underneath base 3 in a protected manner are used to allow assembly and disassembly of the component parts and powering and communication between electrical components of the separable sections of the swing meter apparatus. Meter box 5 includes an attached carrying handle 32 for easy carrying when disconnected from post 4. The complete assembled apparatus providing both left handed and right handed practice positions 1 and 2 can be moved by one person for turf maintenance since it preferably is less than 75 pounds in weight, and the disassembled apparatus can easily be moved long distances or stored as separate assemblies. For one person to move the assembled apparatus such as for mowing around, he need only grasp one edge of base 3, lift and tilt it slightly and drag it to another location. Two people can easily lift and carry the entire apparatus, it is simply generally too large (bulky) for one person to completely lift, but it is not too heavy. The metal surfaces of the mounting base 3, post 4, meter box 5 and tray 14 (14 to be detailed) are treated with an anti-rust process to withstand outside environmental conditions including accidentally becoming wet due to irrigation sprinklers.

Figure 2:
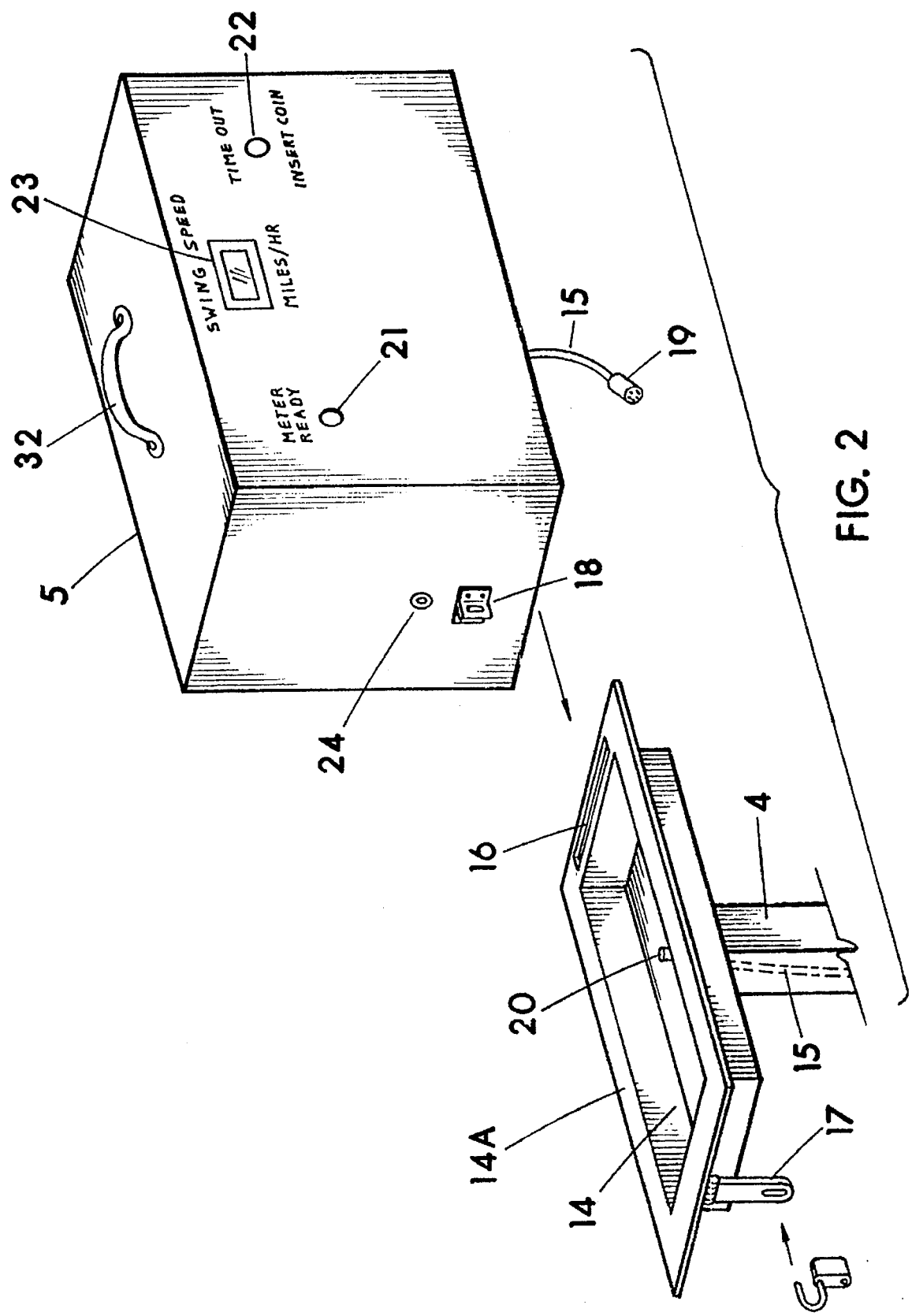
FIG. 2 shows a right rear perspective of the meter box detached from a coin tray on the upper end of the vertical post.

FIG. 2 shows a tray 14 securely attached via welding or other suitable attachment to the top end of post 4 providing a shallow coin collection tray as well as storage space for electrical cable 15 with male electrical cord end 19 extending from the bottom of meter box 5. Also shown is mechanical mounting interface slot 16 for receiving elongated hook-shaped flange 25 (FIG. 3), and padlock hasp components 17 and 18 which provide quick and secure attaching of meter box 5 to post 4 (tray 14) after connecting free hanging male connector 19 to fixed female connector 20 in the bottom of tray 14. Cable 15, with connectors 19 and 20 connect via additional electrical conductors 15A and conductor connectors connecting LED's on base 3, and light sensor units 7 and 8 with electronics and electrical power in meter box 5. Electrical connector 20 is affixed stationary in tray 14 over post 4 with the end thereof exposed to receive connector 19. A wide horizontal flange 14a on tray 14 supports the bottom of meter box 5. Although not shown, a hole is provided in the bottom of meter box 5 allowing deposited coins to fall into tray 14 and for the exiting of cable 15. Elongated hook-shaped member 25 of FIG. 3 hooks through slot 16 when positioned at an angle, and is then pushed slightly toward and further underneath slot 16, followed by resting the bottom of meter box 5 atop flange 14A, and then connecting hasp components 17 and 18 and locking them together with a padlock to secure meter box 5 to tray 14. The delatching of hasp components 17, 18 allows the quick removal of meter box 5 so the coins may be collected, and the meter box 5 may be taken inside for protection from vandals and for recharging of the battery. Other locking structure besides hasp components 17, 18 and the padlock, and slot 16 and hook flange 25 may of course be used within the scope of the invention. I consider tray 14 to be an enlarged component or part of post 4. Post 4, tray 14 and meter box 5 are all preferably made of tough durable metal such as steel treated to be corrosion resistant.

Also shown in FIG. 2 for the right hand golfers are super bright LED's 21 and 22 exposed on meter box 5 which are easily noticeable in bright sunlight and serve to indicate the right handed swing meter is powered up and ready for use or that the meter has timed out or the number of swings is used up and is awaiting coin insertion before the swing meter can again become ready for use. Also shown is liquid crystal display 23 which displays golf club head speed for right handed golfers in miles per hour, and a low battery warning when the battery is low such as by display "battery low" or "low battery" or the like. Also shown is a coin display push button switch 24 which when pushed by the owner or manager of the swing meter displays in one of the LCDs or elsewhere the total number of coins having been inserted, and this is a non-resetable system primarily for auditing purposes. Switch 24 operates in conjunction with electronics within the meter box 5. Except for the collimated photo transistors (light sensor units 7 and 8) located on post 4 and their associated light source LEDs located on the mounting base 3 in light source station 9 and 10, all other electronics utilized in the present invention for coin control, photo sensor interface, swing meter computation, displays and indicators, battery charger and the battery to power the electronics for about 24 hours are preferably located in meter box 5 and will be described later. The battery may be recharged by removing meter box 5 from post 4, connecting connector 19 to a suitable low voltage transformer and plugging the low voltage transformer into a standard 115 V wall outlet.

Figure 3:
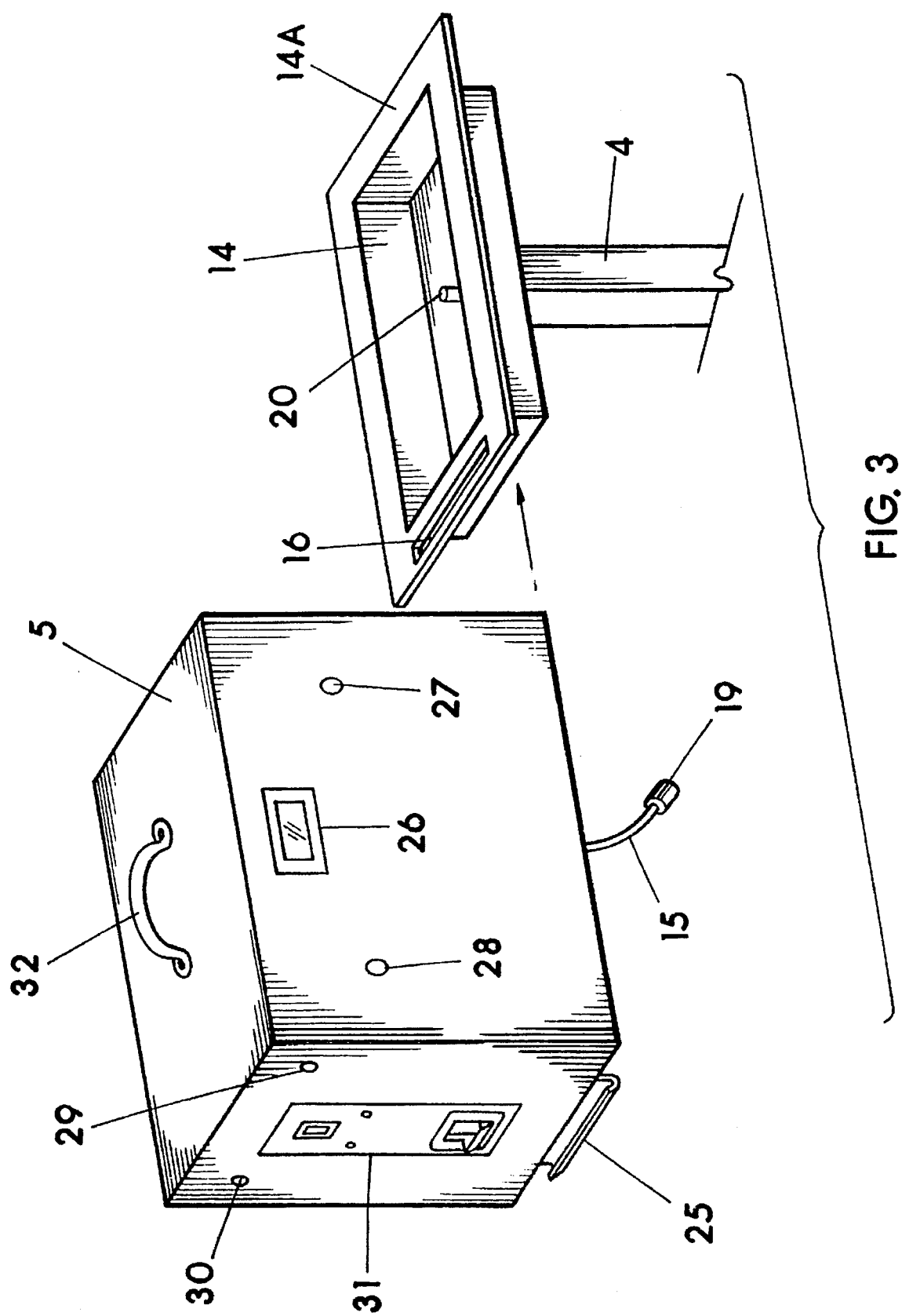
FIG. 3 shows a left front perspective of the detachable meter box detached from the coin tray and post.

FIG. 3 shows meter box 5 with hook flange 25 attached thereto, and detached from tray 14 having slot 16 for receiving flange 25; left handed golfer's swing speed display LCD 26, super bright LED indicators 27 and 28 on meter box 5 which serve to indicate the left handed swing meter is powered up and ready for use or that the meter has timed out or the limited number of swings are spent and is awaiting coin insertion before the swing meter can again become ready for use. Shown on what is considered the front of meter box 5 is left hand start push button switch 29, right hand start push button switch 30 and commercially available electro-mechanical coin acceptor 31. After the required coin or coins setable by the golf practice facility are accepted by coin acceptor 31, the golfer then enables the left handed or right handed swing meter by operating push button switch 29 or 30. If the golfer pushes button 29 for the left side, the selected swing meter timed out/insert coin indicator LED 27 stops flashing and emitting light and the meter ready indicator 28 illuminates informing the golfer that the selected golf practice and swing meter is ready and can be used for the finite period of time also setable by the golf facility. The right side works the same with button 30 being pushed, and once a golfer has started practice on one side or the other, another golfer can insert coins in coin receiver 31 and start playing on the unused side of the swing meter without effecting the golfer who started first on the other side.

Figure 4:
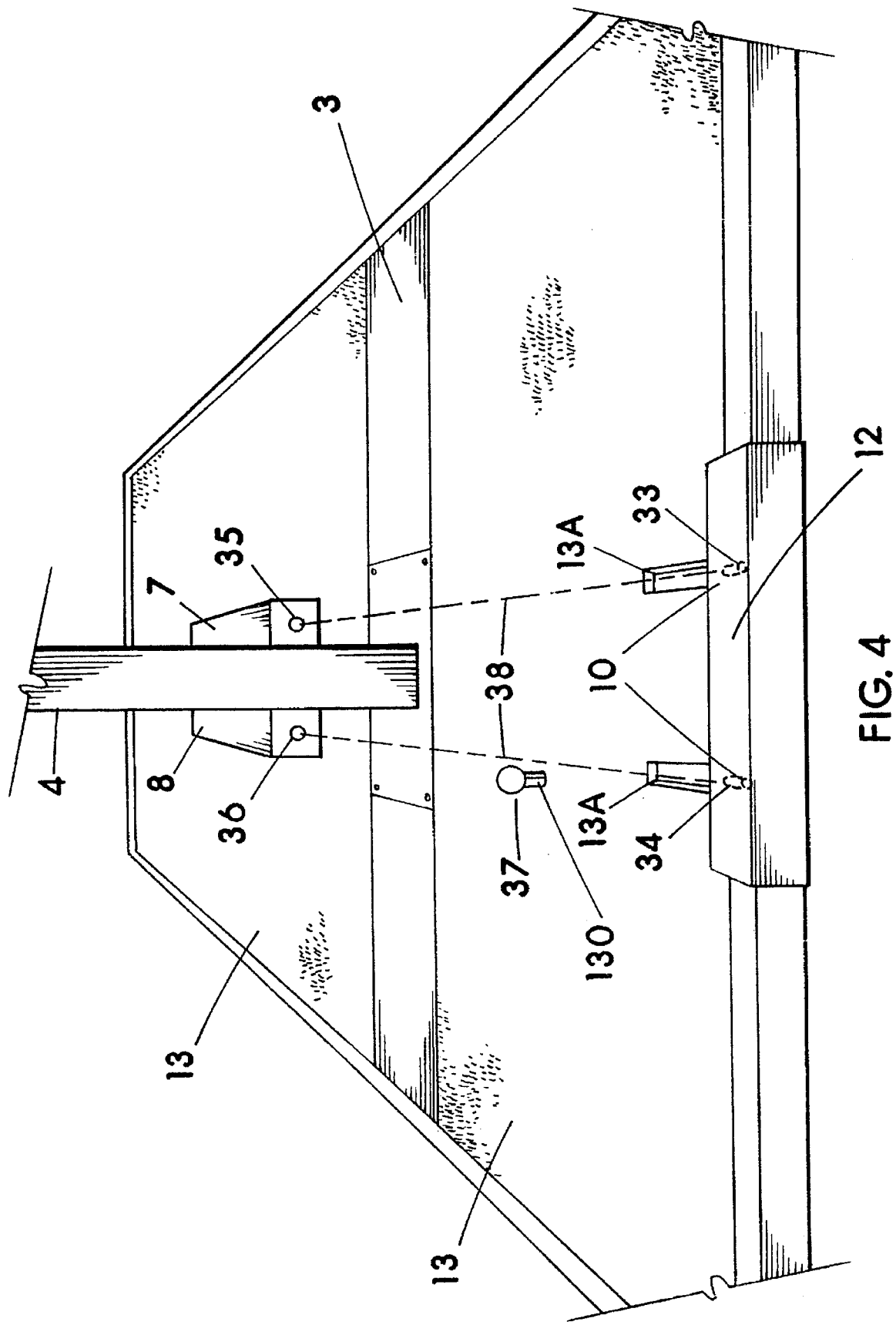
FIG. 4 shows the mechanically fixed relationship between the two collimated light sensors and associated high illuminance light sources which in-part define a club head speed measuring zone.

FIG. 4 shows light sensor units 7 and 8 attached to post 4. Light sensor units 7, 8 each generally comprise a metal box or housing bolted or otherwise securely attached to post 4 so as to be stationary to the post 4. Within the boxes or housings of units 7 and 8 are the tubular light collimators with light sensitive photo transistors as will be explained later. The housings of units 7 and 8 each contain two tubular light collimators, one aimed to the right play zone and one aimed to the left play zone, thus in FIG. 4, the units 7 and 8 are each shown having a small opening 35 and 36 to allow entrance of light from the LEDs 33 and 34 of the right hand light source station 10 for right hand play zone 2 for detecting club swing speed in zone 2. Although not shown but ascertainable from FIG. 6, units 7 and 8 each have a small diameter light entrance opening at the oppositely disposed end from that shown in FIG. 4 and aiming toward the left side play zone 1 for detecting club swing speed in that zone. Also shown in FIG. 4 is the right hand golf club head speed measuring zone as determined by the distance between the two parallel light beams 38 shown as broken lines projected between LEDs 33 and 34 of light station 10 into the small openings 35 and 36 of the collimator tubes of the sensor units 7 and 8. As the left and right play zones and electronics therefore are essentially identical, the balance of the remaining details will be primarily describing the right side play zone and electronics thereof. The distance between the parallel light beams 38 is about six inches for example as shown in FIG. 4. For right handed golfers, rubber tee 130 and object golf ball 37 are located just to the left side of the speed measuring zone, and for left handed golfer's the tee 130 and object golf ball are located just to the right side of the speed measuring zone. As the right handed golfer addresses the golf ball 37 with a golf club and starts a backswing in preparation of striking the ball 37, the light beam between LED 33 and the collimated optical sensor within unit 7 receiving light through opening 35 is interrupted by the club head causing a signal change to be generated by the optical sensor of unit 7, or more precisely by a photo or light sensitive transistor to be detailed. The signal change is communicated via electrical conductors 15 to meter box 5 and the electronics therein. The signal change brought about by interrupting the light entering through opening 35 is timed and compared with an expected signal change from the collimated optical sensor (photo transistor) in unit 8 receiving light through opening 36 by the swing meter electronics in meter box 5. If no signal change is received by the optical sensor through opening 36 in a preset alloted time, the swing meter electronics determines that golfer started a back swing and automatically resets its circuitry causing all zeros to be displayed by liquid crystal display 23. If the optical sensor signals of the swing meter electronics via first detecting a break in the light through opening 35 followed by an interruption in the light through opening 36 within the preset alloted time, the swing meter electronics assumes a golf swing has been made and calculate and determine the time between the two light beam 38 interruptions, and this is translated in a miles per hour rate of movement of the golf clubhead between the beams 38 responsible for interrupting the beams 38, and the electronics of meter box 5 then drive the LCD 23 or 26 to display the speed until the swing meter electronics resets the display (LCD) during the golfer's next backswing or interruption of the first light beam which in FIG. 4 is that between LED 33 and opening 35. If the LCD is displaying the speed of the prior golf club swing and the LCD is not reset to all zeros via a back stroke while addressing the golf ball, the golfer may simply swing and drive the ball 37, and the first light beam between LED 33 and opening 35 will first be broken and the electronics in meter box 5 will begin to count, and if the second light beam between LED 34 and opening 36 is then broken within the preset alloted time, the electronics will drive the LCD to display the speed of that golf club swing, whether it is faster or slower than the previous swing speed which was being displayed on the LCD. If the swing meter electronics receives a signal from an optical sensor via a break in light through opening 36 in unit 8 before seeing a signal change from the optical sensor of unit 7 via opening 35, the swing meter electronics does nothing and the previous liquid crystal display data remains unchanged and this condition is considered by the swing meter electronics to be caused by the golfer's club head interrupting the light beam between LED 34 and the optical sensor behind opening 36 as the golf ball is being addressed or as the golf ball is being placed on the tee 130. The golfer is not required to intentionally reset the electronics of the swing meter after each stroke, as essentially no matter what the golfer does in taking a normal golf swing through the two light beams 38 emitted by LEDs 33 and 34, the swing speed meter will function as desired for the golfer, and I call this an automatic reset function or system even in the event that the LCD does not return to zeros. The electronics in meter box 5 to allow such hands-off resetting or re-displaying of the LCD to the new swing speed will be detailed later.

Also shown in FIG. 4 are elongated grooves or channels 13A in turf 13 and the supporting plywood thereunder, between LEDs 33, 34, and light sensor units 7 and 8, as the LED 33 and 34 are recessed in their fixed position, and underneath a protective supporting structure, i.e., left hand bracket 11 or right hand bracket 12. The LEDs 33 and 34 reside within the grooves 13A and aim upward therefrom toward light sensor units 7 and 8. Channels or grooves 13A allow the light beam from the LEDs to be positioned elevationally low, to project upward at an angle to enter openings 35 and 36, and to be protected from physical damage. Drain holes or other suitable arrangements are made to prevent the grooves or channels 13A from filling up with water and blocking the light from the LEDs 33, 34. The left side shown in FIG. 1 is essentially structured the same as the right side.

Figure 5A:
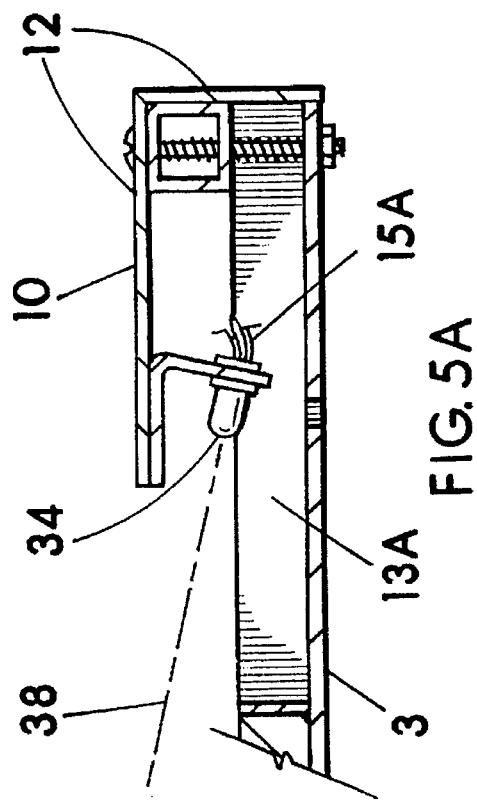
FIG. 5A being a partial cross section shows an enlargement of a portion of FIG. 5.
Figure 5:
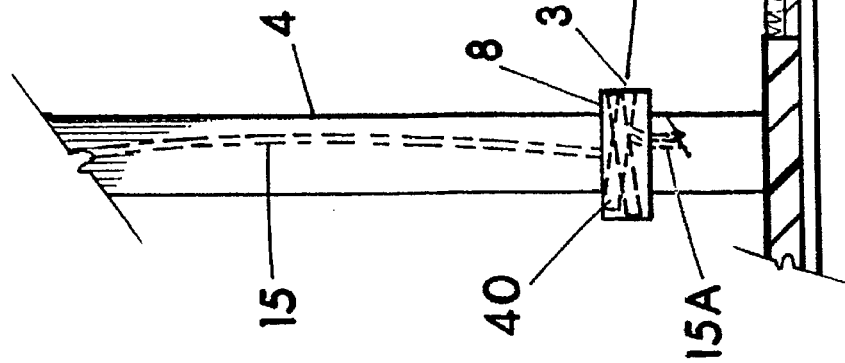
FIG. 5 being a partial cross section shows the downward tilted plane of the collimated light sensors and matching upward tilted angle of light from the LEDs.

FIG. 5 and 5A being in partial cross section shows the right side play zone 2 from another angle from that of FIG. 4, and with FIG. 5A being an enlargement of light source station 10. Shown in FIG. 5 is post 4 attached to base 3 and supporting light sensor unit 8 and the downward tilted plane of the collimated photo transistor sensor 40 receiving light beam 38 the opening 36 from LED 34. Also shown is the matching upward tilted plane of the narrow light beam 38 generated by LED 34 which elevationally and horizontally bisects the object golf ball 37 when on tee 130. The light beam 38 from LED 34 does not strike the golf ball 37, but is to the side thereof. LED 34, is commercially available, and preferably generates light waves predominately 660 nano meters in length with illuminance of 13,000 mcd at a beam angle of four degrees when powered with only 20 milliamps of DC current. LED 34 it is mechanically held in proper aligned position with opening 36 by LED mounting bracket 42 attached to bracket 12 to point its light beam 38 directly at collimated photo transistor 40 within the back end of the collimator tube 50 (FIG. 6) having opening 36. The light sensitive photo transistor 40 is preferably most sensitive to the wave length generated by LED 34. The photo transistor 40 located in the rear of the collimator tube 50 is also commercially available from Honeywell Micro Switch Division, and will produce an electrical signal change representing the light beam 38 intensity, or receipt or non-receipt of the light beam 38. I use a photo or light sensitive transistor 40 in series with a resistor, and apply current through the transistor 40 which allows more current flow with increased light and less current flow with decreased light such as when light beam 38 is interrupted by a golf club. The current flow and the changes therein allowed or caused by photo transistor 40 is sent via electrical conductors 15, connectors 19 and 20 to the electronics in meter box 5 for processing as will be explained later.

The downward tilted plane of the collimated photo transistor axis (light beam receiving angle), downward toward the lower positioned LED 34 inhibits all direct sun rays and much of the reflected sun rays from interfering with the electronic signal produced by photo transistor 40, and the highly illuminous light beam generated by LED 34 combined with the restricted field of view of photo transistor 40 due to collimation allows photo transistor 40 to be self biased for reliable operation under all known outdoor and indoor light environments where the swing meter is likely to be used. Bracket 12 generally comprises rigid metal components such as angle iron structured to bolt to base 3 with built-in indexing via bolts, nuts and tight bolt holes, and LED 34 and 33 mounting plates 42 allowing the LEDs to be held stationary in proper alignment; be removed and replaced with indexing being automatic via the bolts, nuts and bolt holes, and LED securing holes and locks. LED 34 and 33 are power from the battery in meter box 5 through conductor 15, connectors 19 and 20, and conductors 15A. Conductors 15A have male and female cooperative electrical connectors much like 19 and 20 at the base of post 4 to allow the complete disconnection of post 4 from base 3. The left side light source station 9 is built the same as the right side.

Figure 6:
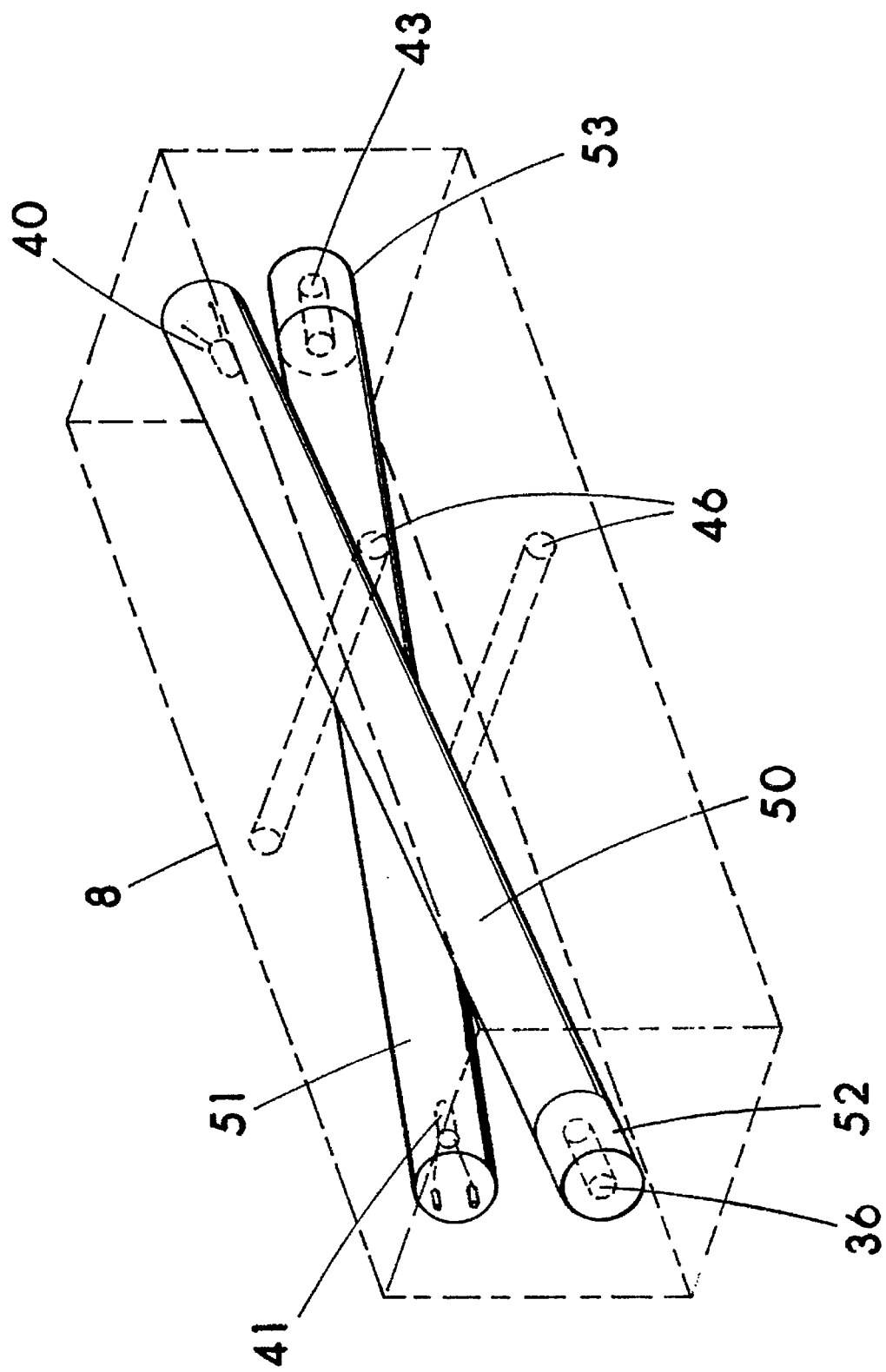
FIG. 6 shows a light sensor unit containing light collimator tubes and photo transistors (light sensors) mounted in the back ends of the collimator tubes.

FIG. 6 shows one of the two essentially identical light sensor units 7 or 8, 8 is shown, containing one collimator tube 50 having a photo transistor 40 for the right handed golfer position 2, and one collimator tube 51 having a photo transistor sensor 41 for the left handed golfer position 1. For the sake of positive clarity at this point, it should be understood that the right hand swing station uses two LEDs for light emitters and two collimated light sensors, as does the left hand swing station. The two light beams 38 of a swing station 1 or 2 when interrupted by a golf swing, the interruption of the first light beam causes a signal or signal change to be sent by the first light sensor via the electrical conductors to the electronics in box 5 which start counting in effect, and when the second light beam is then interrupted within a preset allotted time, the interruption causes the second light sensor to send a second signal or signal change via the electrical conductors to the electronics in box 5 which interpret the signal changes, the time between the interruptions in the light beams 38, calculate the swing speed of the club between the known distance between the light beams and causes the display of the speed. The area between the two light beams just in front of the golf ball is known to be the area which the club reaches is highest effective ball hitting speed. The angularly positioned tubes 50 and 51 are aimed with the open ends in opposite direction from one another, and both are aimed downward toward their respective LED light source station 9 and 10. The housing of unit 8 shown in broken lines and which is preferably made of solid metal such as aluminum is attached to post 4 (see FIG. 1 for location) by bolts inserted through mounting holes 46 and into tapped holes in post 4, and held rigidly in alignment with light beams 38 generated by the previously described LEDs of the light source stations 9 and 10. Each collimator tube 50, 51, is a 0.250 inch diameter hole drilled through unit 8 at an angle aligning the holes with projected light beams 38. 0.250 inch×0.250 inch circular standoffs 52 and 53 each having a 0.0625 diameter holes 36 and 43 respectfully, are then cemented or otherwise affixed inside the 0.250 inch diameter holes of unit 8 and allow light from respective LEDs to enter and pass to the back or rear end of the collimator tube to strike photo transistors 40 or 41 affixed at the back of the tubes. The collimator tubes 50 and 51 as in FIG. 6 are cemented or otherwise affixed to the standoffs 52 and 53 respectively so as to allow light to pass to the back or rear end of the respective collimator tube to strike a centrally photo transistor 40 or 41 affixed at the back of the tube. The inner walls of the collimator holes, opening 36 for example, and standoffs 52 and 53, and the interior of the collimator tubes are treated with a light absorbing material to absorb angular or reflected light, with the light absorbing material being a black anodizing process for example. Photo transistors such as 40 for example whose sensing elements are 0.0625 inches in diameter are attached with their sensing axis aligned with the center of the collimator holes, 36 for example. The small 0.0625 inch diameter hole (36 for example) provided by standoffs 52 and 53 and the light absorbing inner walls of the collimating tube reject most of the light rays that are not parallel with the sensing axis of collimated photo transistor 40 or 41. The collimator tubes 50 and 51 are 3.00 inches in length (the length preferred in the present invention) between standoffs 52 and 53 and the respective photo transistors 40, 41 at the back central end of the tubes 50 and 51, allowing only light rays whose origin are within 7.17 ARC minutes of the collimator's sensing axis to be seen by the photo transistors 40, 41. The 7.17 arch minute angle is derived by computing the angle from the bottom of the photo transistor's sensing element to the top of the 0.0625 diameter hole in the standoff resulting in finding the angle whose adjacent side is 3 inches and whose side opposite is 0.0625 inches resulting in an angle whose tangent equals 0.0208 which is that of an angle of 7.17 arch minutes. A projection of the 7.17 arch minute angle along the about 26.5 inch distance between the photo transistor's sensing element (40 for example) and the high illuminance light source generated by LED 34 for example, in the present invention shows that only light rays within a 1.1 inch diameter circle around the center of the light source generated by light emitting diode 34, projected along the sensing axis of the collimator will be seen by the photo transistor 40, and this insures that the photo transistors produce highly reliable electrical signals indicating a change in the light beam intensity from the intended LED light source as any type of golf club transitions through the light beam 38 regardless of the ambient light environment, thus this aspect of the present invention is a substantial improvement compared to prior art where the light source is in a horizontal plane with the light sensors, and require either physical adjustments or electrical adjustments by the user depending upon the light environment conditions to operate reliably.

Figure 7:
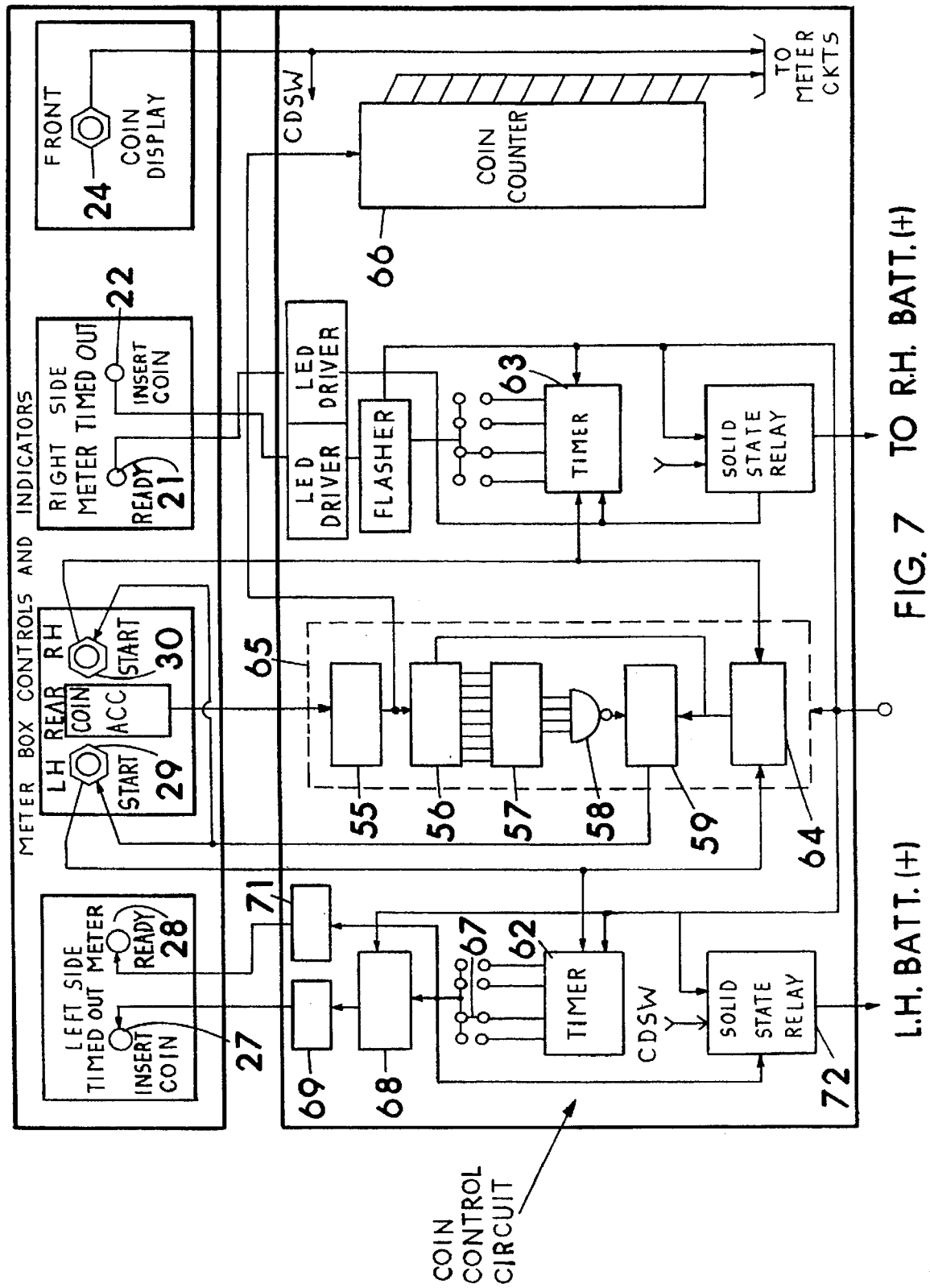
FIG. 7 is a functional block diagram primarily of coin control circuitry contained within the meter box.
Figure 8:
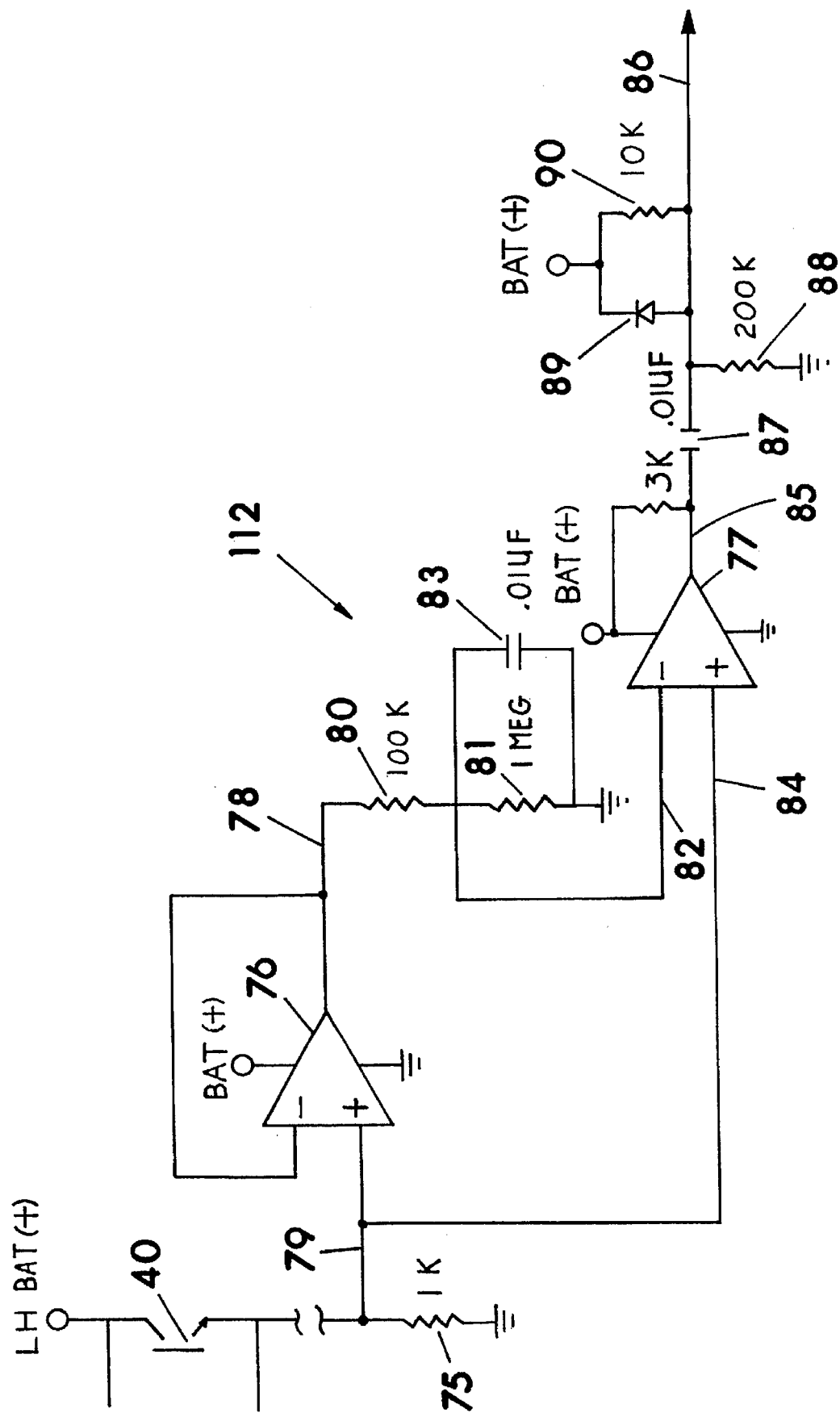
FIG. 8 is a schematic diagram of a sensor amplifier which self adjusts to ambient light conditions.
Figure 9:
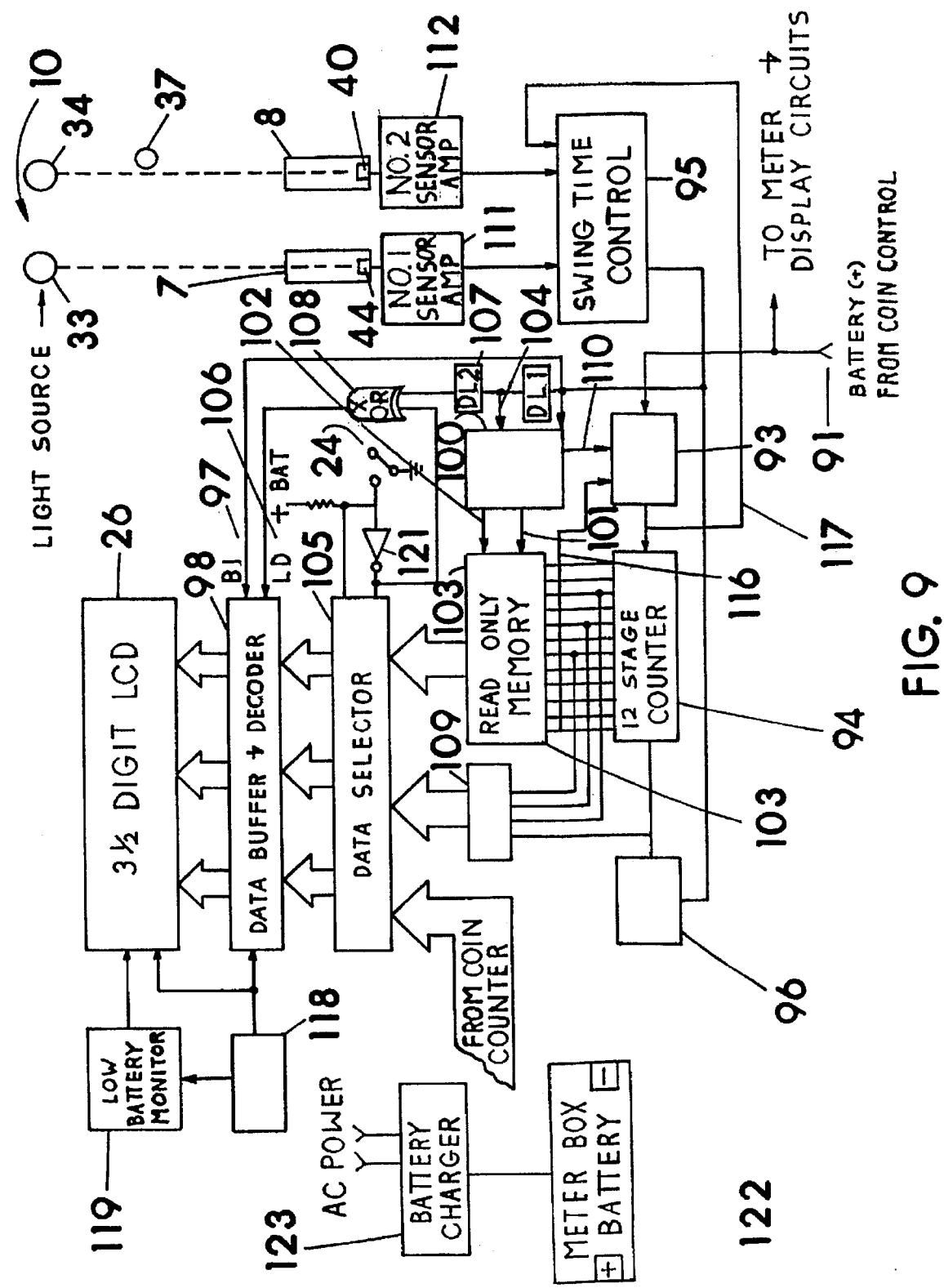
FIG. 9 is a functional block diagram of the swing meter circuitry for the right hand swing zone.

Having now described for example the mechanical aspects of a preferred embodiment of the present invention, the electronics portion of the present invention will now be disclosed by referring mostly to FIGS. 7 through 9. FIG. 7 is a functional block diagram of the meter box 5 controls and indicators and coin control circuitry which controls the application of battery power to enable the left handed golfer swing meter circuits or to the identical right hand golfer swing meter circuits or to both left and right hand swing meter circuits for a preset and adjustable finite period of time after the also preset and adjustable number of coins have been accepted by coin acceptor 31, commercially available by Coinco, Tempe, Ariz., which checks the size and weight of the inserted coin and if accepted allows it to fall through its coin chute and operate a single pull double throw micro switch as it falls into tray 14 previously described. Signals from the coin detector switch are fed to coin detector 55 to remove any switch bounce noise. The output of coin detector 55, is counted by 4 stage counter 56, the low and high signals from each stage of the counter appears in cross connect field 57, the inputs to nand gate 58 also originate in the cross connect field, the position of four 0.1 inch jumper clips selects the desired state of the counter to produce a logic zero signal from nand gate 58 when the desired number of coins have been detected and sets the coin count ok circuit 59 so that its output is logic level zero, the output of coin count ok circuit 59 enables both LH start switch 29 and RH start switch 30, operation of either LH start or RH start switch passes the logic level zero through the switch to enable left side timer 62 or right side timer 63 and coin count reset circuit 64 to clear coin count ok 59 and four stage counter 56 so that the coin detection and counting circuitry 65 may again be used. Timer 62 generates four logic signals all which start when left hand start switch 29 is operated and last for 1 minute, 2 minutes, 3 minutes and 4 minutes, the desired output of the timer is selectable per the golf facility's requirements by placing 0.1 inch jumper clip 67 for the desired time, the level logic signal from the timer through the jumper 67 stops the flasher 68 by turning off LED driver 69 and the timed out insert/coin indicator 27 on the left hand golfer's side of meter box 5 goes dark, timer 62 logic level signal also enables LED driver 71 causing the meter/ready indicator 28 on the left hand side of meter box 5 to illuminate, and also causes solid state relay 72 to operate and supply battery power to the left hand meter circuits. After timer 62 times out, flasher 68 and LED driver 69 are turned on causing timed out/insert coin indicator 27 to flash, LED driver 71 to be turned off, meter ready indicator 28 to go dark and solid state relay 72 to open and disconnect power from the left hand meter circuits. Right hand coin control circuits operate identically to that just described for the left hand coin control circuits. The output of coin detector 55 is also connected as an input to non-manually resetable decade counter 66 whose contents can be displayed by one or both of the swing meter liquid crystal displays by operating coin display switch 24 to determine the total number of coins inserted, up to the quantity of one thousand, after which the counter starts counting again from zero. The coin counter is provided as an audit tool and provides information to the owner, lessor or lessee to help prevent theft of coins, and it allows a lessor of the present invention, in case of a revenue sharing lease, to give the coin collection responsibility to the lessee and not be required to travel frequently to the leaser's golf practice facility to collect and divide revenue. The coin control circuitry in the present invention conserves battery power when the swing meter is not being used by turning off power to all other circuitry. The coin control circuits, including the flashing left hand and right hand timed out/insert coin indicators require approximately less than 16 milliamps drain on the battery in the idle condition. Solid state relays are used to control power to the swing meter electronics instead of conventional wire wound relays because the solid state relays consume far less power in their operated state.

FIG. 8 is a schematic diagram of what I call a sensor amplifier 112. A sensor amplifier such as 112 is used in connection with each of the collimated photo transistors such as 40 in each light sensor units 7 and 8. The sensor amplifiers are located in meter box 5. The primary purpose of the sensor amplifier 112 is to further eliminate the possibility of false triggerings and readings caused by slow changing ambient light reaching a photo transistor such as 40. Ambient light changes normally occur relatively slowly, such as by clouds passing over, shadows of people walking by, or the blowing of tree limbs and the like. On the other hand, a golf club swing to drive a ball is a very rapid event which when the club shaft or head interrupts light beam or beams 38 from the LEDs of the light stations such as 9 or 10, the interruption of the light beam 38 occurs very fast, being typically 100 to 200 microseconds to block sufficient light to be detected. Sensor amplifier 112 essentially establishes a reference voltage (signal) representing relatively long term normal light beam 38 intensity or a relatively long term overall received light intensity received by the photo transistor 40, and if a 10% or greater decrease in the light intensity occurs rapidly (before the amplifier's 112 reference signal can adjust to the decreased light beam intensity) this is interpreted as a club swing to drive a ball and the sensor amp 112 outputs a negative going logic level pulse and sends this information to additional electronics of the swing meter, and specifically to swing time control 95. If a 10% decrease in light intensity occurs relatively slowly (over a period of time approximately 5 milliseconds) then the sensor amplifier 112 holds it output at a high logic level and no interpretation or assumption of a club swing in progress is made. In the manner just described, the circuitry of the sensor amp 112 further eliminates false reading and triggering from what I call relatively slow ambient light changes. The sensor amplifier is for use in the present invention to generate logic level signals for additional swing meter electronics indicating an interruption in the light beam 38 seen by one of the collimated photo transistors such as 40 for example. Resistor 75 self biases collimated photo transistor 40 to its linear operating region, light beam 38 seen by the lens of collimated photo transistor 40, causes an electrical current representing light intensity to flow through resistor 75, resulting in a voltage being developed across resistor 75 whose amplitude represents light intensity, which is connected to the non-inverting inputs of operational amplifier 76 and voltage comparator 77. Operational amplifier 76 is configured as a voltage follower and as such the voltage at its low impedance output 78 is the same amplitude as its input voltage 79, the output of the operational amplifier 78 is divided by resistors 80 and 81 such that ninety one percent of the voltage representing the intensity of the light beam 38 seen by photo transistor 40 is also the reference voltage for the inverting input 82 of voltage comparator 77, capacitor 83 charges through resistor 80 to reference voltage, under static conditions with no impediment of the light beam seen by photo transistor 40 the voltage at the non-inverting input 84 of voltage comparator 77 is 9.1 percent higher amplitude than inverting input 82 causing the output of voltage comparator 85 to be maximum positive, equaling that of its battery power and output voltage of the circuit 86 since DC voltage is blocked by capacitor 87 to be positive to within 95% of the battery voltage as determined by voltage divider resistors 90 and 100. When the light beam 38 seen by photo transistor 40 suddenly decreases in intensity such that the voltage across resistor 75 is less than voltage comparator reverence voltage 82, the output of voltage comparator 85 decreases rapidly to zero volts, causing capacitor 87 to discharge through resistor 88, creating a negative going pulse of voltage across resistor 88 and at circuit output 86, capacitor 83 starts discharging through resistor 80 toward the suddenly decreased voltage level at the output of voltage follower 78 causing a decrease in comparator reference voltage 82. When comparator reference voltage 82 again becomes less positive than its non-inverting input 84 (whether caused by the clubhead no longer blocking more than approximately 10% of the light beam causing the voltage across resistor 75 to increase back to its normal level or by capacitor 83 discharging to the decreased voltage across voltage divider resistors 80, 81.), output 85 again goes maximum positive causing capacitor 87 to recharge through resistor 88 generating a positive going voltage spike across resistor 88, the positive going spike is clamped to plus battery voltage by diode 89. As can be seen by the previous description, the reference voltage for voltage comparator 77 is established by the voltage across capacitor 83 and that capacitor 83 essentially charges and discharges through resistor 80 when the voltage at the output of voltage follower 76 changes in amplitude as a result of a change in light intensity seen by photo transistor 40. The values of resistor 80 and capacitor 83 are selected in the present invention such that approximately 0.005 seconds of time is required for reference voltage 82 to reach its static level.

FIG. 9 of the drawings illustrate the preferred simple straight forward method of measuring and displaying golf club head speed without using a typical or conventional processor and stored program control. Upon application of battery (+) voltage 91, controlled by the previously explained coin control circuit, meter and display circuits shown in FIG. 9 and light source station 10 are made operable. Application of power enables reset control 93 which resets 12 stage counter 94 and swing time control 95 which is an R S flip flop as such that its Q output goes low stopping clock generator 96, removing the blank enable signal 97 to data buffer and decoder 98 enabling liquid crystal display 26. The low going edge of swing time control 95's Q output signal also triggers memory read control 100 to start a memory read cycle by making its circuit enable not signal 101 to read only memory 103 go low followed by delay no 1 signal 104 causing memory read control 100 to make its output enable not 102 to go low. Read only memory 103 upon seeing output enable not 102 go low makes its output data transition through data selector 105 and be loaded into data buffer and decoder 98. Load disable signal 106 going low after delay no. 2 107, through exclusive or gate 108 prevents any other change in data from being loaded into data buffer and decoder 98. Circuit enable not 101 and output enable not 102 signals from memory read control 100 are short duration negative going pluses whose duration exceeds that of delay no. 1 (104) and delay no. 2 (107) to insure that valid read only memory data 103 is present at the input to data buffer and decoder 98 when load disable signal 106 goes low. At the end of the memory read cycle just described memory read control 100 outputs signal 110 to reset control 93 which in turn resets 12 stage counter 94 and swing time control 95, and since swing time control 95'S Q output signal is already low the memory ready cycle is not performed and the swing meter electronics is considered to be in its static state with outputs of both sensor amplifiers 111 and 112 high due to both collimated photo transistors 40 and 44 seeing unimpeded light beam 38s from LEDs 33, 34 of light source station 10, the high level outputs of the sensor amplifiers 111 and 112 do not change the state of swing time control 95 and it remains reset with its Q output low. As a right handed golfer prepares to strike golf ball 37 with a golf club, the light beam 38 seen by collimated photo transistor 44 is blocked momentarily as the golfer starts to make a backswing causing sensor amplifier 111 to produce a low level pulse which sets swing gate control Q output 95 high, allowing clock generator 96 to run, and blank enable signal 97 causes the liquid crystal display 26 to go blank and load disable signal 106 to go high after transitioning through DL1 and DL2 107 and X or gate 108 enabling data to be loaded into data buffer and decoder 98. Clock generator output pulses, 35.75 microseconds apart, in the present invention are counted by 12 stage binary counter 94, whose outputs are used as address lines for read only memory 103. 100 mile per hour detector 109 outputs a digit one in its normal state and its inputs from 12 stage counter 94 and clock generator 96 are set for a counter value representing 100 miles per hour or less to reset the 100 miles per hour detector momentarily, such that its output to data selector 105 is digit zero when data is transferred through data selector 105 to data buffer and decoder 98. If 2.048 clock pulses, representing 0.0732 seconds of elapse time are counted by 12 stage counter 94 a high signal generated by the 12 stage counter's last stage 116 causes reset control 93 to again reset the swing meter circuitry in the same manor as previously explained for power on reset and the momentary blockage of the light beam seen by collimated photo transistor 44 is treated as a backswing and zero, zero, zero will be displayed on liquid crystal display 26 because 100 mile per hour detector 109 detected a count representing less than 100 miles per hour and 12 stage counter 94 gets reset and outputs address zero to read only memory 103 before reset control signal 117 can propagate through swing time control 95 and its Q signal go low and initiate the memory read cycle previously described. After being reset by the golfers backswing the swing meter electronics is again in its static state with outputs of both sensor amplifiers 111 and 112 high and swing time control Q signal 95 is low. As the golfer completes the club head swing, the club head momentarily interrupts the light beam 38 to collimated photo transistor 44 causing no. 1 sensor amplifier 111 to output a sharp low pulse, causing swing time control Q signal 95 to go high, followed by an interruption of the light beam 38 to collimated photo transistor 40 causing no. 2 sensor amplifier 112 to output a sharp low pulse which resets swing time control 95 causing its Q output to go low and initiate a memory read cycle. For the period of time that swing time control Q signal 95 was high, liquid crystal display 26 was blanked and clock generator 96 clock pulses were counted by 12 stage counter 94, outputs of the counter became the hexidecimal address for read only memory 103 where club head speed is stored as two 4 bit binary data bytes for each memory address and 100 mile per hour detector 109 examined 12 stage counter outputs to determine if it should output a digit one or a digit zero to data selector 105 during the read cycle. The three data bytes, two least significant from read only memory 103 and the most significant from 100 mile per hour detector 109 transitioned through data selector 105 were loaded into data buffer and decoder 98 where it is stored and decoded to seven segment decimal format and applied in required phase relationship to the liquid crystal display 26 elements to display the contents of the read only memory 103 and 100 mile per hour detector 109 until being reset as a result of the golfer's next backswing or until battery power is removed by the coin control circuit shown in FIG. 7. Phase oscillator 118 generates the alternating current source required by liquid crystal display 26, data buffer and decoder 98 and low battery monitor circuit 119, which causes a low battery warning to appear on the liquid crystal display when battery voltage is less than 4.6 volts. When coin display switch 24 is operated, contents of the coin counter appear at data selector 105 output and is loaded into data buffer and decoder 98 since load disable signal is forced to go high by inverted 121 and transitions through X or gate 108 to enable loading of data buffer and decoder 98. Contents of the coin counter may be any decimal number between zero and nine hundred ninety nine and this data is displayed by liquid crystal display 26 until the coin display switch is released. A 6 volt battery 122 rated at 6.5 amp hours is used to power all of the coin control and swing meter electronics. Based upon 100 percent usage the battery will supply sufficient power to operate a dual left handed and right version of the unit for over 24 hours, however, it is recommended that the meter box be removed and taken inside each night to charge the battery using the supplied low voltage transformer which plugs into 115V 60 HZ wall outlets using built in charger circuit 123 to slow charge the battery over night.

The table below is an illustration of some of the 12 stage counter counts, in decimal form, as a hex address, the state of the 100 mile per hour detector, and the read only memory contents for several different golf club swing speeds based upon the present inventions speed measuring zone width of six inches.

| Decimal Count | Hex Address | 100 MPH Detector Disabled | Memory Contents | LCD Display Miles/HR |
|---|---|---|---|---|
| 784 | 2FF | Yes | 11 | 011 |
| 255 | 0FF | Yes | 33 | 033 |
| 200 | 0C7 | Yes | 42 | 044 |
| 100 | 064 | Yes | 84 | 084 |
| 92 | 0C5 | Yes | 92 | 092 |
| 85 | 055 | Yes | 99 | 099 |
| 84 | 054 | No | 01 | 101 |
| 81 | 051 | No | 04 | 104 |
| 4 | 040 | No | 32 | 132 |

Noteworthy for the present invention is that mechanical tolerances for assembly of the photo transistor collimator and their associated light sources are preferably held to within 0.005 inch by laser cutting techniques and that clock generator 97 is crystal controlled with an accuracy of +/−0.002% allowing the swing meter accuracy to be within +/−1 mile per hour for swing speeds less than 92 miles per hour and to within +/−2 miles per hour for swing speeds from between 92 miles per hour and 132 miles per hour. Club head speeds up to 92 miles per hour were given the most consideration for accuracy because only a low percentage of golfers swing faster than 90 miles per hour. It should also be noted that accuracy can be increased to within +/−0.2 miles per hour by increasing the clock generator frequency, adding another stage of read only memory, and by adding another digit stage to the data selector, data buffer and decoder, and liquid crystal display.

Furthermore, I anticipate adding additional circuitry capable of detecting jarring or tilting of meter box 5 such as by thieves and vandals which when triggered will sound an alarm such as an audible alarm. The "tilt" alarm will include a keyed switch allowing only the rightful controller of the apparatus to turn this system off for intentionally moving meter box 5. Additionally, meter box 5 and the LCDs and LEDs on box 5 as well as sensor unit 7, 8, and light stations 9 and 10 are all installed water tight, and the coin receiver slot receives a drip hood so that the apparatus may sit in the rain or under sprinklers without becoming damaged from water entrance.

Although I have very specifically described the preferred structures and use of the invention, it should be understood that some changes in the specific structures described and shown in my drawings may clearly be made without departing from the true scope of the invention in accordance with the appended claims.

What I claim as my invention is:

1. A golf club swing speed meter for detecting and outputting data regarding golf club swing speed, comprising;

base means for supporting post means attached to said base means and extending vertically upward from said base means;

electronic means within housing means attached to said post means, said electronic means including golf club swing speed calculating and data output means for functioning in cooperation with light emitting means attached to said base means for directing a first light beam and a second light beam into light sensor means for receiving the first and second light beams and signalling representations of intensity of received light beams to said electronic means;

said electronic means including sensor amplifier means for establishing a reference signal representing received light intensity signalling from said light sensor means and for utilizing said reference signal as means to gauge a decrease in received light intensity by said light sensor means wherein said decrease occurs within a preset time duration prior to said electronic means interpreting a golf club swing as occurring;

golf ball holding means attached for holding a golf ball in position for hitting with a golf club, said golf ball holding means attached between said light emitting means and said light sensor means so that a golf club swing at a golf ball held by said golf ball holding means will move through and interrupt said first light beam first and said second light beam secondly to trigger signalling changes between said light sensor means and said electronic means wherein said electronic means calculates and outputs data indicating speed of the golf club swing as calculated relative to interruptions of both the first and second light beams;

light collimator means in combination with said light sensor means for restricting ambient light from having full access to said light sensor means;

said light collimator means including a downwardly sloped axis aimed at said light emitter means for further restricting ambient light from having full access to said light sensor means.

2. A portable golf club swing speed meter for detecting and outputting data regarding golf club swing speed, comprising;

stabilizing base means for resting unattached on a surface and supporting post means attached to said base means and extending vertically upward therefrom;

electronic means within housing means, said housing means attached by lockable and unlockable latch means at an upper end of said post means, said housing means removable from said post means by way of unlocking said latch means; said electronic means including golf club swing speed calculating and data output means for functioning in cooperation with light emitting means attached to said base means for directing a first light beam and a second light beam into light sensor means attached to said post means for receiving the first and second light beams and signalling representations of intensity of received light beams to said electronic means;

said electronic means including sensor amplifier means for establishing a reference signal representing received light intensity signalling from said light sensor means and for utilizing said reference signal as means to gauge a decrease in received light intensity by said light sensor means wherein said decrease occurs within a preset time duration prior to said electronic means interpreting a golf club swing as occurring;

golf ball holding means attached to said base means for holding a golf ball in position for hitting with a golf club, said golf ball holding means attached between said light emitting means and said light sensor means so that a golf club swing at a golf ball held by said golf ball holding means will move through and interrupt said first light beam first and said second light beam secondly to trigger signalling changes between said light sensor means and said electronic means representing received light intensity changes wherein said electronic means calculates and outputs data indicating speed of the golf club as calculated relative to interruptions of both the first and second light beams;

light collimator means in combination with said light sensor means for restricting ambient light from having full access to said light sensor means;

said light collimator means including a downwardly sloped axis aimed at said light emitter means for further restricting ambient light from having full access to said light sensor means;

battery power means within said housing means for providing electrical power to said electronic means;

electrical conductors including disconnectable and reconnectable conductor means extending between said housing means, said light sensor means and said light emitter means for providing electrical power from said battery power means to said light sensor means and said light emitter means, and for carrying the signals representing received light intensity from said light sensor means to said electronic means within said housing means.

\* \* \* \* \*